(12) United States Patent
Xu

(10) Patent No.: US 11,963,834 B2
(45) Date of Patent: Apr. 23, 2024

(54) DENTAL FLOSSER WITH MEANS FOR ADJUSTING FLOSS TENSION

(71) Applicant: Meng Xu, West Vancouver (CA)

(72) Inventor: Meng Xu, West Vancouver (CA)

( * ) Notice: Subject to any disclaimer, the term of this patent is extended or adjusted under 35 U.S.C. 154(b) by 928 days.

(21) Appl. No.: 16/545,739

(22) Filed: Aug. 20, 2019

(65) Prior Publication Data

US 2021/0052357 A1 Feb. 25, 2021

(51) Int. Cl.
*A61C 15/04* (2006.01)

(52) U.S. Cl.
CPC .................... *A61C 15/046* (2013.01)

(58) Field of Classification Search
CPC .................... A61C 15/046; A61C 15/045
See application file for complete search history.

(56) References Cited

U.S. PATENT DOCUMENTS

| | | | |
|---|---|---|---|
| 1,512,633 A | 10/1924 | Peckham | |
| 3,236,247 A | 2/1966 | Brockman | |
| 3,993,085 A | 11/1976 | Skinner | |
| 4,655,233 A * | 4/1987 | Laughlin | A61C 15/046 D28/68 |
| 4,832,062 A * | 5/1989 | Grollimund | A61C 15/046 132/327 |
| 5,113,880 A * | 5/1992 | Honda | A61Q 11/00 132/321 |
| 5,139,038 A | 8/1992 | Gazayerli | |
| 5,183,064 A * | 2/1993 | Barth | A61C 15/048 132/321 |
| 5,305,768 A * | 4/1994 | Gross | A61C 15/041 132/321 |
| 6,155,274 A * | 12/2000 | Stein | A61C 15/046 132/327 |
| 8,893,733 B2 | 11/2014 | Welt | |
| 2012/0180809 A1* | 7/2012 | Bai | A61C 15/046 132/327 |
| 2012/0279518 A1* | 11/2012 | Alas | A61C 15/02 132/324 |
| 2015/0059791 A1* | 3/2015 | Sheppel | A61C 15/046 132/200 |
| 2016/0067021 A1 | 3/2016 | Zwimpfer | |
| 2018/0140397 A1* | 5/2018 | Kozak | A61C 15/045 |

\* cited by examiner

*Primary Examiner* — Nicholas D Lucchesi
*Assistant Examiner* — Jennifer Gill
(74) *Attorney, Agent, or Firm* — Jeffer Mangels Butler & Mitchell LLP; Brennan C. Swain, Esq.

(57) ABSTRACT

A dental flosser is disclosed. The dental flosser comprises a U-shaped portion having a first arm and a second arm spaced apart from each other, a handle portion which extends from the U-shaped portion, a floss strand having a length and a first end and a second end, and a floss strand attachment member. The first end of the floss strand is fastened to the first arm of the U-shaped portion, and the second end of the floss strand is fastened to the floss strand attachment member, and a middle portion of the floss strand is slideably mounted to the second arm of the U-shaped portion. A user can maneuver the floss strand attachment member to increase or decrease or maintain tension of the floss strand.

17 Claims, 14 Drawing Sheets

US 11,963,834 B2

DENTAL FLOSSER WITH MEANS FOR ADJUSTING FLOSS TENSION

TECHNICAL FIELD

The present invention relates in general to dental and oral cleaning devices and in particular to hand-held dental flossers (e.g., dental floss picks or dental floss holders) with means for adjusting floss tension, and to methods for making and using such dental flossers.

BACKGROUND

The spaces between teeth and the surfaces of teeth in general can be cleaned by a variety of methods including brushing, machine-driven jets of water, toothpicks and the like, and by flossing with dental floss or dental tape or similar thread. Dental floss is a cord of thin filaments generally used to remove food and dental plaque from teeth.

One of the chief causes of caries (dental cavities) and a principal cause of periodontal (gum and root) disease is bacterial plaque formation that develops on tooth surfaces. When removed, new plaque can reform in less than 24 hours. Therefore, in order to maintain optimal dental hygiene and health, flossing should be carried out at least once per day.

Many people do not floss their teeth on a daily basis, because the manual procedure for using conventional dental floss is difficult and tedious. The use of a hand-held dental flosser (also known as a floss holder or a floss pick) has made flossing more convenient and less difficult. A dental flosser generally comprises two prongs extending from a thin plastic body (or handle). A floss strand runs between the two prongs. As an example, a conventional dental flosser is disclosed in U.S. Design Pat. No. D618396 entitled "Dental floss pick". Conventional dental flossers are usually made of a rigid and inflexible plastic material, and the tension of the floss strand between the two prongs is fixed.

A major shortcoming of conventional dental flossers is that the tension in the floss strand is fixed, so that the relatively high tension required to enable proper insertion of the floss strand between the teeth, which action requires the floss strand to remain tense, does not allow the floss strand to curve around the profile of the tooth away from the interdental space. As a consequence, proper cleaning of plaque and bacteria from surfaces of the teeth other than interdental surfaces is not readily performed.

Therefore, it is desirable to provide an improved hand-held dental flosser with means for adjusting floss tension and which is more effective for cleaning the tooth surfaces around the profile of the tooth (including the front surface, the back surface, and the interdental surface of the tooth).

BRIEF DESCRIPTION OF DRAWINGS

In drawings which show non-limiting embodiments of the invention.

DETAILED DESCRIPTION

Figure 1:
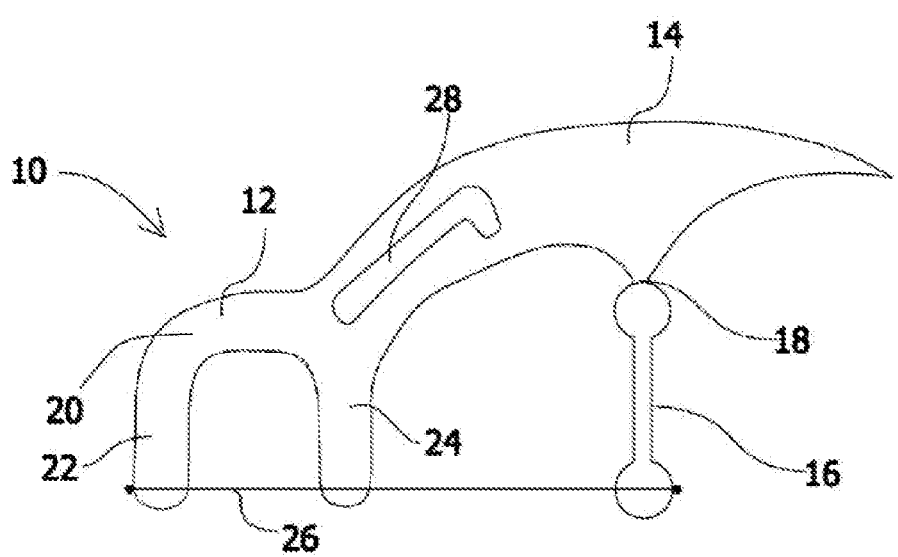
FIG. 1 shows a side view of a dental flosser according to an example embodiment of the invention, wherein a slide member portion is detachably connected to a handle portion of the dental flosser.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

One aspect of the invention relates to a hand-held dental flosser. The dental flosser comprises a U-shaped portion which has two spaced-apart arms (a first arm and a second arm), and a handle portion connected to the U-shaped portion. The dental flosser also comprises a floss strand. The floss strand comprises a first terminal end and a second terminal end. The first terminal end of the floss strand is fixedly attached to the first arm of the U-shaped portion such that the position of the first terminal end of the floss strand does not move relative to the first arm of the U-shaped portion. The location of this attachment may be at or near the end of the first arm of the U-shaped portion. The second terminal end of the floss strand is attached to a floss strand attachment piece. A user can manipulate the floss strand attachment piece either manually (or mechanically or electronically) to move the second terminal end of the floss strand to increase or decrease or maintain tension of the floss strand. A middle portion of the floss strand is slideably mounted on the second arm of the U-shaped portion such that a middle portion of the floss strand can slide relative to the second arm of the U-shaped portion. A number of possible mounting mechanisms may be employed to enable a middle portion of the floss strand to be slideably mounted on the second arm of the U-shaped portion, such as a fixed pulley, a pivot, a wheel, a rotor, a channel, a passageway, a hole, or some other suitable means. The location of the mounting mechanism may be at or near the end of the second arm of the U-shaped portion. The mounting mechanism prevents the floss strand from getting completely detached from the second arm of the U-shaped portion, but allows the floss strand to slide.

One aspect of the invention relates to a hand-held dental flosser. The dental flosser comprises a U-shaped portion which has two spaced-apart arms, a handle portion connected to the U-shaped portion, and a slide member portion separate from or detachably connected to the handle portion (or the U-shaped portion). In some embodiments, the U-shaped portion, the handle portion and the slide member portion are all made of a same suitable material (such as plastic) and are manufactured using an injection molding process. In some embodiments, the dental flosser is manufactured as a one-piece product, having the U-shaped portion, the handle portion and the slide member portion connected together. The slide member portion may be connected to either the handle portion or the U-shaped portion at a narrow connecting point, and a user can apply force at the narrow connecting point to break the slide member portion apart from the handle portion or the U-shaped portion so that the slide member becomes a separate component.

The dental flosser also comprises a floss strand. In some embodiments, the floss strand is injection molded with the dental flosser in situ. The floss strand has two ends. The first end of the floss strand is fastened to and embedded in the first arm of the U-shaped portion (i.e., the arm distal to the handle portion). The second end of the floss strand is fastened to and embedded in the slide member. There are a number of methods to securely fasten the ends of the floss strand. One example method is to let the end of the floss strand to extend out from the plastic during the injection molding process and to heat or burn the floss strand ends to coalesce into beads of diameter greater than the floss, which prevents the floss strand from being pulled out from the plastic.

A middle section of the floss strand passes through a channel inside the second arm of the U-shaped portion. This channel is created when the floss strand is injection molded with the dental flosser in situ. The middle section of the floss strand can slide inside the channel inside the second arm of the U-shaped portion.

The floss strand has three contact points (or contact regions) with the dental flosser. The floss strand has a first end which is fastened to the first arm of the U-shaped portion. This is the first contact point. The floss strand has a second end which is fastened to the slide member. This is the second contact point. Between its first end and its second end, the floss strand also contacts the second arm of the U-shaped portion by passing through the channel or some other mounting mechanism in the second arm of the U-shaped portion. This is the third contact point. In this sense, the function of the second arm of the U-shaped portion with respect to the floss strand is similar to a fixed pulley which enables the floss strand to be mounted on it and slide around it. The length of the floss strand between its two ends is fixed. However, the portion of the floss strand between the first and second arms of the U-shaped portion is adjustable by the user.

One aspect of the invention relates to a method of using the hand-held dental flossers as disclosed herein. If the floss strand attachment piece (e.g., the slide member portion) is connected to the handle portion of the dental flosser, a user can first break the slide member portion apart from the dental flosser. The user can then pull or hold the floss strand piece to increase or maintain the tension of the floss strand between the first and second arms of the U-shaped portion. Alternatively, the user can attach the floss strand attachment piece to a mechanical or electrical mechanism to increase or maintain the tension of the floss strand. When the floss strand is in tension, the user can maneuver the dental flosser to insert the floss strand between two adjacent teeth. Once the floss strand is inserted in the interdental space, the user can decrease the tension of the floss strand (i.e., to slacken the floss strand) either manually or through a mechanical or electrical mechanism. This allows the floss strand to curve around the contour of the tooth and to clean multiple surfaces of the tooth, not only the interdental surface, but also the front surface and back surface of the tooth. After the user has cleaned the tooth, the user can again increase or maintain the tension of the floss strand and to pull the floss strand out from between the teeth. The user can repeat this process to adjust of the tension of the floss strand and to clean additional teeth in the user's mouth.

In some embodiments, the dental flosser comprises a longitudinal guide groove or channel in the handle portion. The groove or channel is dimensioned such that the slide member can fit into the groove or channel and can slide along the groove or channel. The user can fit the slide member into the groove or channel and then use his or her thumb or finger to slide the slide member along the groove or channel. When the slide member is moved in one direction, it increases the tension of the floss strand. When the slide member is moved in the other direction, it decreases the tension of the floss strand. Therefore, the user can adjust the tension of the floss strand at will by sliding the slide member along the guide groove.

It should be understood that the adjustment of the tension of the floss strand is accomplished through the floss strand attachment piece (e.g., the slide member) which is connected to only one end of the floss strand, whereas the other end of the floss strand is securely fastened to one of the arms of the U-shaped portion. Therefore, one end of the floss strand is fixed, and the other end of the floss strand is moveable when the user moves or manipulates the floss strand attachment piece. This makes it easier for the user to fine-tune the tension of the floss strand, since the position of one end of the floss strand is fixed.

It should be understood that the adjustment of the tension of the floss strand is not accomplished through the deformation of the U-shaped portion. The U-shaped portion is generally a rigid structure that does not deform easily. The dental flosser can be made of a thermoplastic material that has enough rigidity or toughness. The distance between the first and second arms of the U-shaped portion generally does not change.

Figure 2:
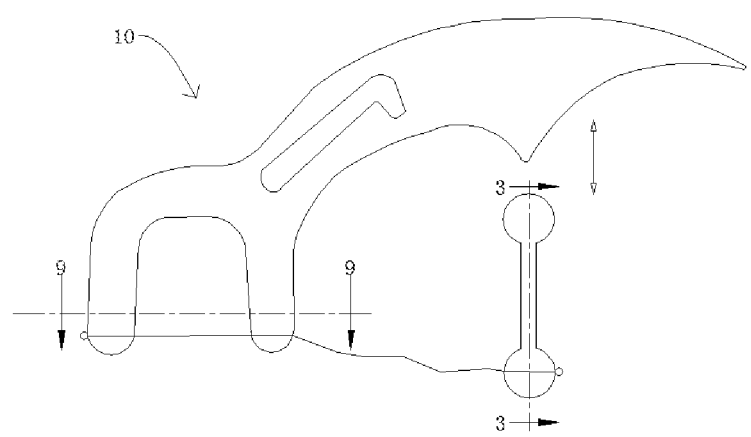
FIG. 2 shows the floss holder of FIG. 1, wherein the slide member portion is broken apart from the handle portion of the dental flosser.

FIGS. 1 and 2 show a dental flosser 10 according to an example embodiment of the present invention. Dental flosser 10 comprises a U-shaped portion 12, a handle portion 14 and a detachable slide member portion 16. In FIG. 1, slide member portion 16 is connected to handle portion 14 at a frangible connection point or narrow connecting point 18. Dental flosser 10 is manufactured as a one-piece product through an injection molding process. The material for manufacturing dental flosser 10 can be a thermoplastic material.

In FIG. 2, slide member portion 16 is broken apart from handle portion to form a separate slide member component. This is usually done by a user. U-shaped portion 12 comprises a base 20 and a pair of spaced apart arms 22 and 24 extending from base 20. In FIG. 1, the arms 22 and 24 are shown oriented substantially parallel to one another, but it will be understood that they may be otherwise oriented to provide spaced apart ends.

A strand of dental floss 26 extends from arm 22 to arm 24 and further to slide member portion 16. A first end of floss strand 26 is securely fastened to arm 22. A second end of floss strand 26 is securely fastened to slide member portion 16. Portions of the ends of floss strand 26 are embedded in arm 22 and slide member 16. In the manufacturing process, dental flosser 10 is injection molded with floss strand 26 in situ, such that floss strand 26 passes through arm 22, arm 24, and slide member portion 16. Floss strand 26 can slide though a channel in arm 24. The ends of floss strand 26 are secured to arm 22 or slide member portion 16. One example method is to let the ends of floss strand 26 to extend out from the plastic during the injection molding process and to heat or burn the floss strand ends to coalesce into beads of diameter greater than the floss, which prevents the floss strand from being pulled out from arm 22 or slide member portion 16.

U-shaped portion 12 and handle portion 14 are generally flat members. The plane of U-shaped portion 12 is substantially the same plane as handle portion 14. Therefore, floss strand 26 when tensioned is on the same plane as the plane of handle portion 14. This feature make it easier for the user to know the orientation of floss strand 26 when using dental flosser 10 by holding handle portion 14 to place floss strand 26 into interdental space between teeth.

Dental flosser 10 also comprises a groove 28 in handle portion 14. Groove 28 is an elongated groove. The transverse dimension and the depth of groove 28 is such that slide member 16 can be received in groove 28 and move along groove 28 in a longitudinal direction thereof. The longitudinal length of groove 28 would control the maximum extent slide member 16 can move along groove 28.

Figure 3:
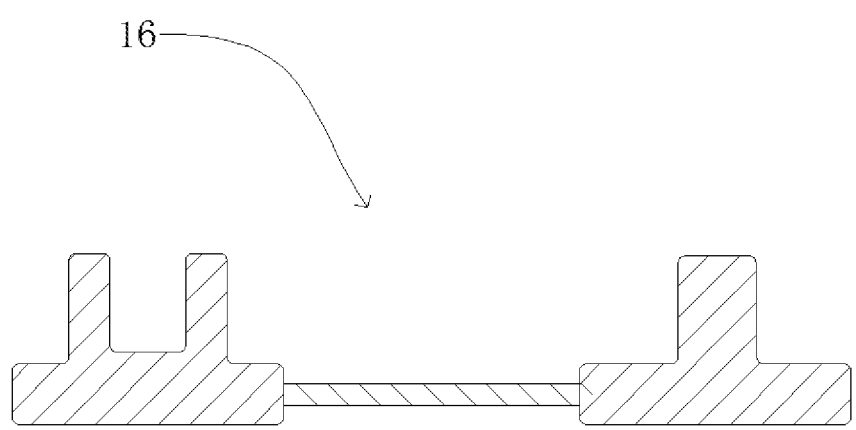
FIG. 3 shows a cross-sectional view of the slide member in isolation from the rest of the dental flosser. One end of the slide member comprises a female member, and the other end of the slide member comprises a corresponding male member of a dimension such that the slide member can be folded and the male member can fit into the female member.

FIG. 3 shows a cross-sectional view of slide member or floss strand attachment member 16 in isolation from the rest of the dental flosser. For simplicity, the floss strand is not shown in FIG. 3. One end of slide member 16 comprises a female member, and the other end of the slide member comprises a corresponding contact member with male member of a dimension such that the male member can fit into the female member when slide member 16 is folded by the user.

Figure 4:
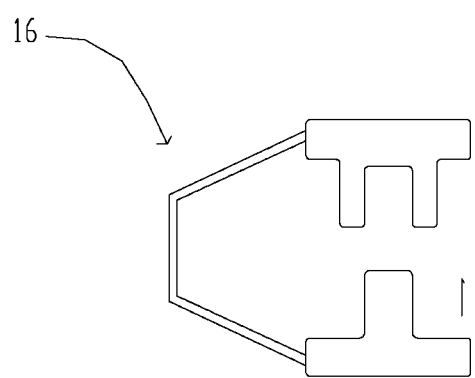
FIG. 4 shows a cross-sectional view of the slide member of FIG. 3, wherein the slide member is being folded to allow the male member to be connected to the female member.

FIG. 4 shows a cross-sectional view of slide member 16 of FIG. 3, wherein the slide member is being folded to allow the male member to be connected to the female member. The folded slide member 16 is easier for the user's thumb or finger to hold and maneuver.

Figure 5:
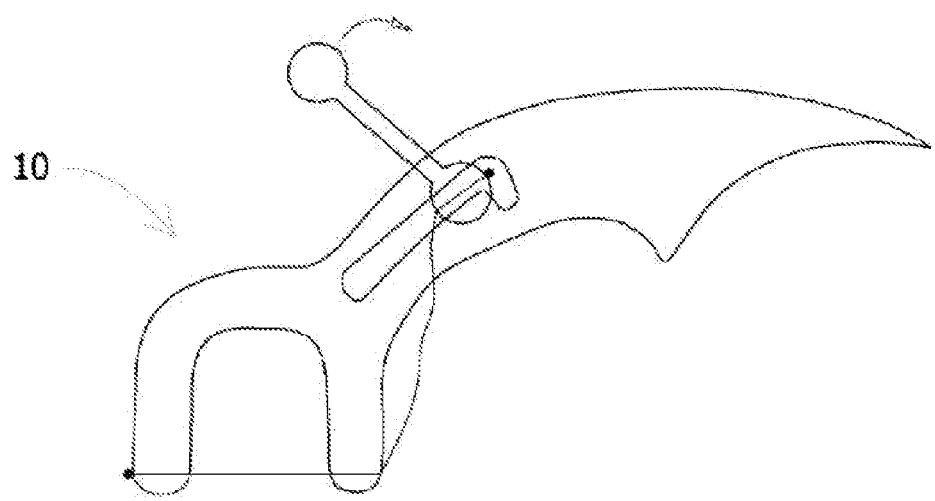
FIG. 5 shows the dental flosser of FIG. 2, wherein the unfolded slide member is fit into a guide groove or channel in the handle portion of the dental flosser.
Figure 6:
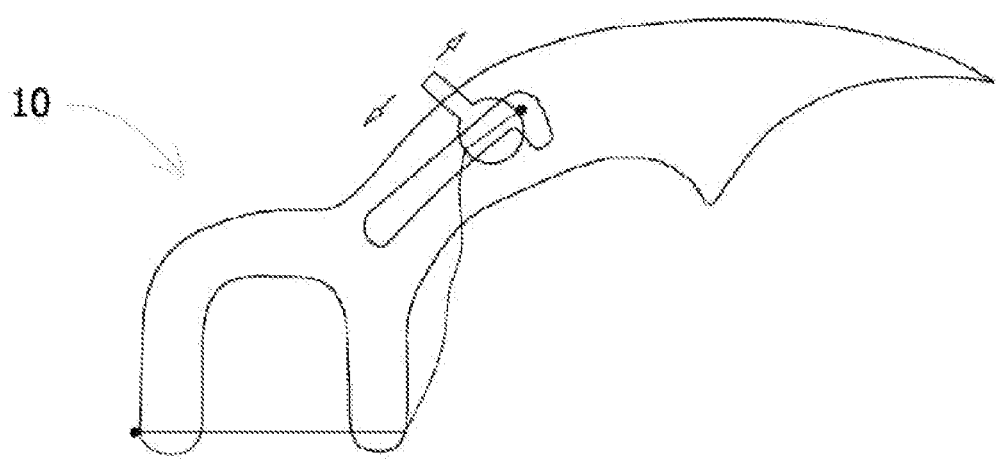
FIG. 6 shows the dental flosser of FIG. 5, wherein the slide member is folded in a way as illustrated in FIGS. 3 and 4.

FIG. 5 shows dental flosser 10, wherein unfolded slide member 16 is fit into groove 28 of dental flosser 10. FIG. 6 shows slide member 16 is now folded so that it is easier for the user to hold and maneuver slide member 16.

Figure 7:
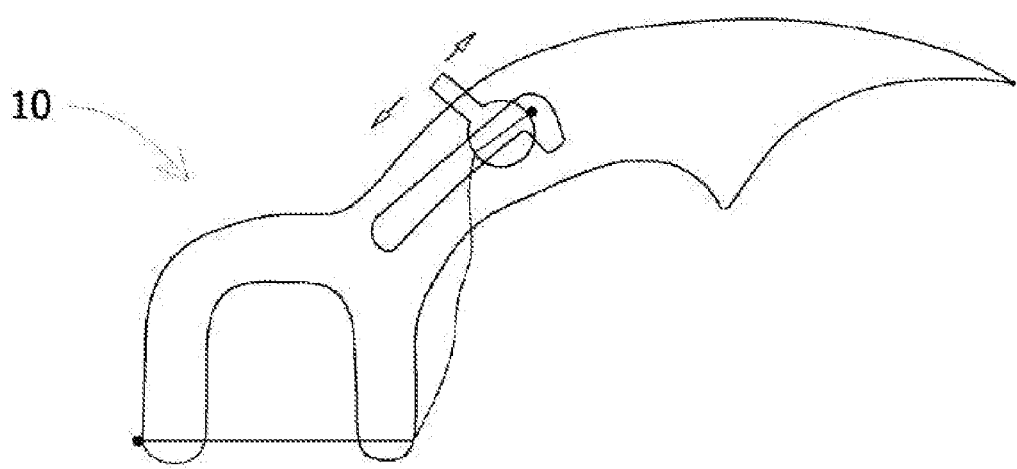
FIG. 7 shows the dental flosser of FIG. 6, wherein the slide member moves in a first direction along the guide groove or channel to increase the tension of the floss strand.

FIG. 7 shows slide member 16 moves in a first direction along groove 28 to increase the tension of floss strand 26. In FIG. 7, the tensioned floss strand 26 between arms 22 and 24 is straight. When floss strand 26 is tensioned, the user can press dental flosser 10 downward to insert floss strand 26 into an interdental space between two adjacent teeth.

Figure 8:
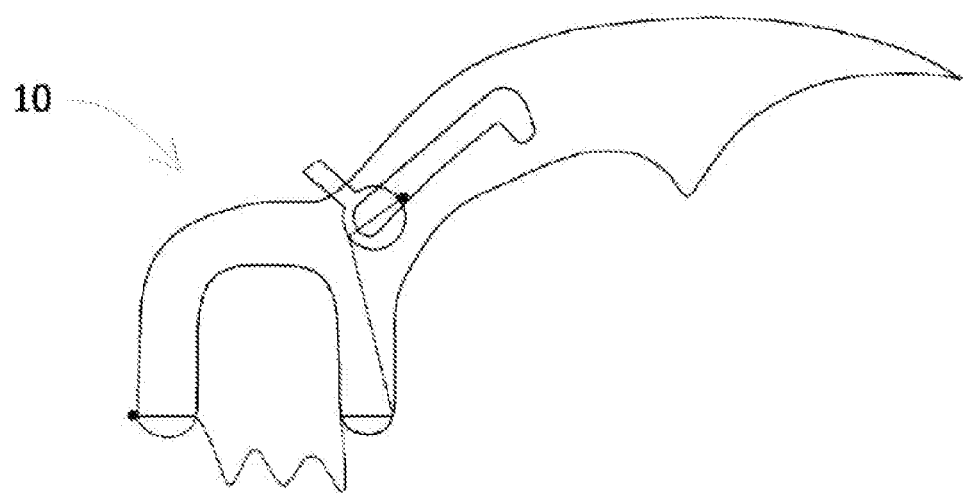
FIG. 8 shows the dental flosser of FIG. 6, wherein the slide member moves in a second direction along the guide groove or channel to decrease the tension of the floss strand.

FIG. 8 shows slide member 16 moves in a second direction along groove 28 to decrease the tension of floss strand 26. In FIG. 8, floss strand 26 between arms 22 and 24 is slack and has an increased length. The user can maneuver dental flosser 10 sideways to let floss strand 26 to curve around the contour of a tooth.

It should be understood that the total length of floss strand 26 provided with dental flosser 10 is fixed. Floss strand 26 is already fastened to dental flosser 10 during the manufacturing process. The user does not need to mount or string floss strand 26 to dental flosser 10. However, the user can maneuver slide member 16 to adjust the length (and the tension) of the portion of floss strand 26 between arms 22 and 24.

Figure 9:
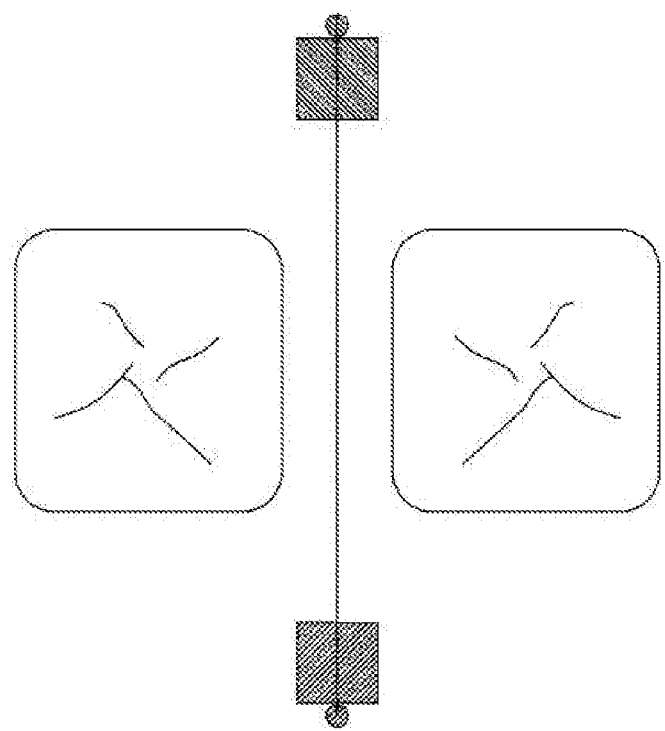
FIG. 9 shows a schematic top view of two adjacent teeth and the cleaning portion of a floss strand inserted in an interdental space between the teeth.
Figure 10:
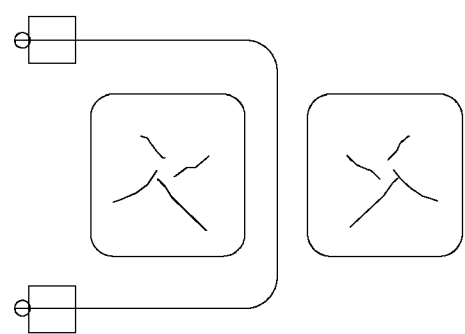
FIG. 10 shows a schematic top view of two adjacent teeth and the cleaning portion of a floss strand surrounding the interdental surface as well as the front surface and the back surface of one of the teeth.

FIG. 9 shows a schematic top view of two adjacent teeth and the position of a tensioned dental strand in an interdental space between the teeth. FIG. 10 shows a schematic top view of two adjacent teeth and the position of a relaxed dental strand surrounding the interdental space as well as the front surface and the back surface of a tooth.

Compared to conventional dental flossers, dental flosser 10 is advantageous in a number of ways. First, dental flosser 10 can be used to simultaneously clean three surfaces of a tooth (the interdental surface, the front surface and the back surface). Second, the user can adjust the tension of the floss strand at will. Since one end of floss strand is fixed to arm 22 and does not move, the user only needs to move the other end of floss strand which is attached to slide member 16. Third, the user can adjust the length of the floss strand between arms 22 and 24 to fit teeth of different sizes and dimensions. Fourth, dental flosser 10 can be conveniently manufactured as a one-piece product including floss strand and the detached or detachable slide member portion in an injection molding process. Fifth, the volume of material for manufacturing dental flosser 10 is not much greater than manufacturing a conventional dental flosser. The slide member portion is a small component, and does not add much volume of material for manufacturing dental flosser 10. Injection molding equipment can be used or adapted to manufacture dental flosser 10. No specialized equipment or machinery or assembly is required to manufacture dental flosser 10. Sixth, dental flosser 10 can be sold as a disposable product, which provides more convenience for some consumers. Seventh, the user does not have to worry about floss strand 26 accidentally getting detached from dental flosser 10, because floss strand 26 is securely and permanently fastened to dental flosser 10.

Figure 11:
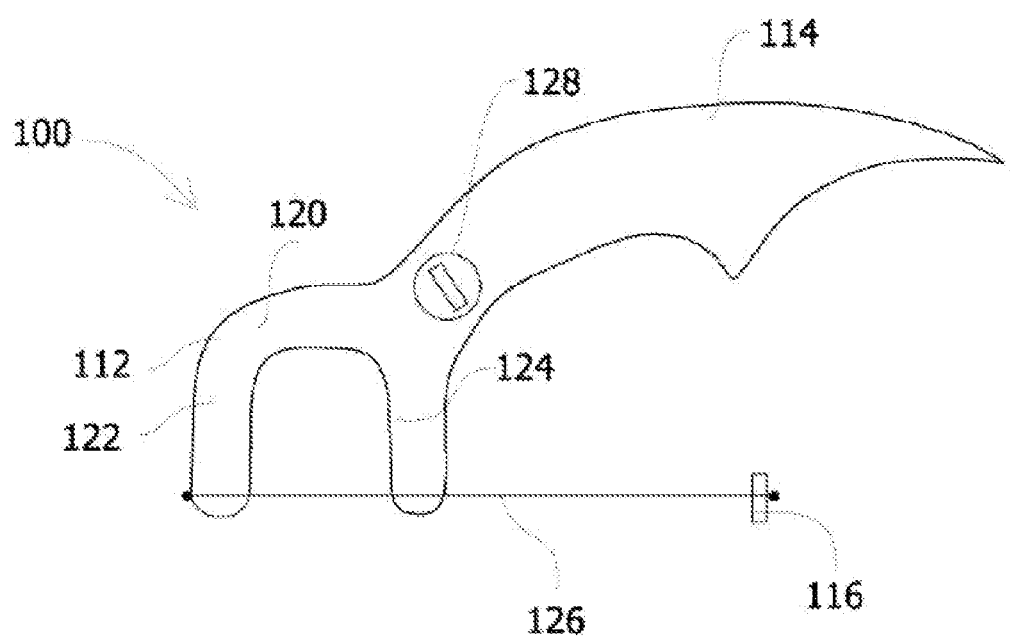
FIG. 11 shows a side view of a dental flosser according to another example embodiment of the invention, wherein one of the terminal ends of the floss strand is connected to a floss strand attachment piece, and the dental flosser comprises a rotation mechanism.
Figure 12:
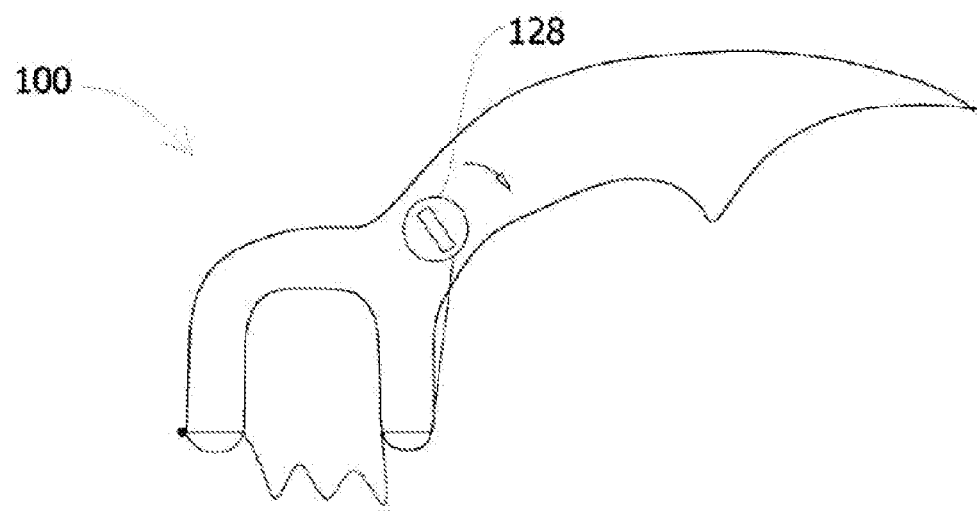
FIG. 12 shows the dental flosser of FIG. 11, wherein the floss strand attachment piece is attached to the rotation mechanism, and wherein the floss strand is slack.
Figure 13:
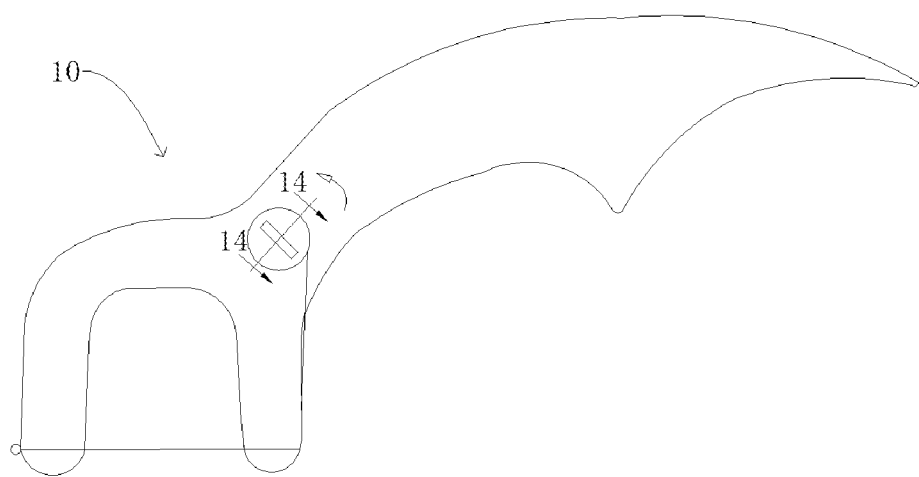
FIG. 13 shows the dental flosser of FIG. 11, wherein the floss strand attachment piece is attached to the rotation mechanism and the rotation mechanism is rotated in a counterclockwise direction to increase the tension of the floss strand.

FIGS. 11 through 13 show a dental flosser 100 according to another example embodiment of the present invention. Dental flosser 100 comprises a U-shaped portion 112, a handle portion 114, and a floss strand attachment member 116. U-shaped portion 112 comprises a base 120 and a pair of spaced apart arms (first arm 122 and second arm 124) extending from base 120. Dental flosser 100 comprises a floss strand 126. Floss strand 126 has a first terminal end which is fixedly attached to first arm 122 of U-shaped portion 112. The position of the first terminal end of floss strand 126 does not move relative to first arm 122 of U-shaped portion 112. As shown in FIGS. 11 through 13, the first terminal end of floss strand 126 is fixedly attached to an end of first arm 122. Floss strand 126 has a second terminal end which is attached to floss strand attachment member 116. As shown in FIGS. 11 through 13, floss strand attachment member 116 can be separate from handle portion 114, but can also be connectable to a rotation mechanism 128 on handle portion 114. A user can manipulate floss strand attachment member 116 either manually (or mechanically or electronically) to move the second terminal end of floss strand 126 to increase or decrease or maintain tension of the floss strand.

A middle portion of floss strand 126 is slideably mounted on second arm 124 of U-shaped portion 112 such that a middle portion of the floss strand can slide relative to second arm 124 of U-shaped portion 112. A number of possible mounting mechanisms may be employed to enable a middle portion of the floss strand to be slideably mounted on the second arm of the U-shaped portion, such as a fixed pulley, a pivot, a wheel, a rotor, a channel, a passageway, a hole, or some other suitable means. In the example shown in FIG. 11, the mounting mechanism is a channel at or near the end of second arm 124 of U-shaped portion 112. A middle portion of floss strand 126 can slide through the channel in second arm 124.

Figure 14:
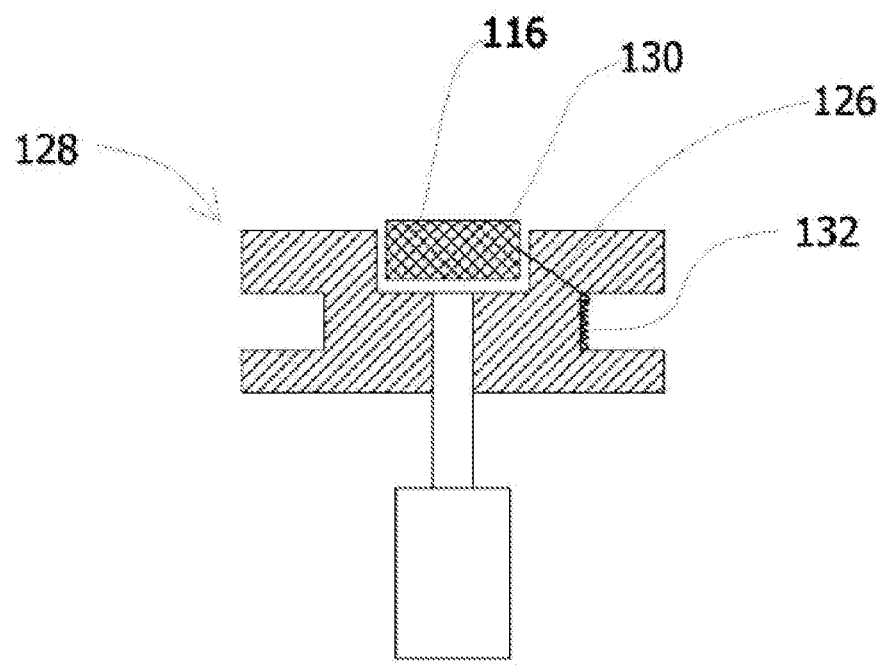
FIG. 14 is an enlarged cross-sectional view of an example rotation mechanism which can be used in the dental flosser of FIG. 11.

Dental flosser 100 comprises a rotation mechanism 128. Rotation mechanism can be a manual, mechanical or electrical rotation mechanism. As shown in FIGS. 12 and 13, a user can attach floss strand attachment member 116 to rotation mechanism 128. Once attached, the user can rotate rotation mechanism 128 in one direction (e.g., counterclockwise) to increase the tension of floss strand 126. The user can also rotate rotation mechanism 128 in another direction (e.g, clockwise) to decrease the tension of floss strand 126. If needed, the user can also disconnect floss strand attachment member 116 from rotation mechanism 128. FIG. 14 shows an enlarged cross-sectional view of an example rotation mechanism 128 which can be used. Rotation mechanism 128 comprises a recess 130 for receiving floss strand attachment member 116 and a circular groove 132 for winding floss strand 126.

As will be apparent to those skilled in the art in the light of the foregoing disclosure, many alterations and modifications are possible in the practice of this invention. The scope of the claims should not be limited by the preferred embodiments set forth in the examples, but should be given the broadest interpretation consistent with the description as a whole.

What is claimed is:

1. A dental flosser comprising:
a U-shaped portion having a first arm and a second arm spaced apart from each other, a handle portion which extends from the U-shaped portion, wherein the handle portion and the U-shaped portion are co-planar and define a first plane that bifurcates the handle portion and the U-shaped portion, a floss strand having a length and a first end and a second end, and a floss strand attachment member, wherein the first end of the floss strand is fastened to the first arm of the U-shaped portion, and the second end of the floss strand is fastened to the floss strand attachment member, and a middle portion of the floss strand is slideably mounted to the second arm of the U-shaped portion, wherein the first end of the floss strand is integrally embedded in the first arm of the U-shaped portion and does not move relative to the first arm of the U-shaped portion, wherein the middle portion of the floss strand passes through a channel at or near the end of the second arm of the U-shaped portion which prevents the floss strand from getting detached from the second arm of the U-shaped portion but allows the floss strand to slide through, wherein the handle portion includes a slot defined therethrough, wherein the floss strand attachment member can be received in the slot and maneuvered along the slot to increase or decrease tension of the floss strand, wherein the handle portion defines a top surface, a bottom surface and opposing first and second side surfaces, wherein the slot is defined through the handle portion from the first side surface to the second side surface wherein the first plane bifurcates the slot and the channel, wherein the floss strand attachment member includes a contact member and a male member extending from the contact member, wherein the male member defines a first axis, wherein the male member includes a proximal end that is attached to the contact member and a distal end opposite the contact member, wherein the distal end of the male member can extend into the slot and through the first plane such that the first axis is perpendicular to the first plane while the contact member is located outside the slot, and such that a user can maneuver the floss strand attachment member with the contact member.

2. A dental flosser comprising:
a U-shaped portion having a first arm and a second arm spaced apart from each other, wherein the second arm includes a channel defined therethrough,
a handle portion which extends from the U-shaped portion, wherein the handle portion and the U-shaped portion are co-planar and define a first plane that bifurcates the handle portion and the U-shaped portion, wherein the handle portion includes a slot defined therethrough, wherein the handle portion defines a top surface, a bottom surface and opposing first and second side surfaces, wherein the slot is defined through the handle portion from the first side surface to the second side surface, and wherein the first plane bifurcates the slot,
a floss strand having a length and a first end and a second end, and
a floss strand attachment member that includes a contact member and a male member extending from the contact member, wherein the male member defines a first axis, wherein the male member includes a proximal end that is attached to the contact member and a distal end opposite the contact member, wherein the distal end of the male member extends into the slot and through the first plane, wherein the first axis is perpendicular to the first plane, wherein the contact member is located outside the slot such that the user can maneuver the floss strand attachment member along the slot with the contact member to increase or decrease tension of the floss strand,
wherein the first end of the floss strand is fastened to the first arm and the second end of the floss strand is attached to the floss strand attachment member, wherein a middle portion of the floss strand extends through the channel, and wherein the channel lies in the first plane.

3. A dental flosser comprising:
a U-shaped portion having a first arm and a second arm spaced apart from each other, wherein the second arm includes a channel defined therethrough,
a handle portion which extends from the U-shaped portion, wherein the handle portion and the U-shaped portion are co-planar and define a first plane that bifurcates the handle portion and the U-shaped portion, wherein the handle portion includes a slot defined therethrough, wherein the handle portion defines a top surface, a bottom surface and opposing first and second side surfaces, wherein the slot is defined through the handle portion from the first side surface to the second side surface, and wherein the first plane bifurcates the slot, a floss strand having a length and a first end and a second end, wherein the first end of the floss strand is fastened to the first arm and the second end of the floss strand is attached to the floss strand attachment member, wherein a middle portion of the floss strand extends through the channel such that a portion of the floss strand extends between the first and second arms, wherein the channel lies in the first plane, and a floss strand attachment member that includes a contact member and a male member extending from the contact member, wherein the male member defines a first axis, wherein the male member includes a proximal end that is attached to the contact member and a distal end opposite the contact member, and wherein the distal end of the male member can extend into the slot and through the first plane such that the first axis is perpendicular to the first plane while the contact member is located outside the slot and can move along the slot to increase or decrease the tension of the floss strand.

4. The dental flosser according to claim 1, wherein the user can move the floss strand attachment member in a direction away from the first arm of the U-shaped portion to increase tension of the floss strand.

5. The dental flosser according to claim 4, wherein the user can move the floss strand attachment member in a direction toward the first arm of the U-shaped portion to decrease tension of the floss strand.

6. The dental flosser according to claim 1, wherein the dental flosser is manufactured as a one-piece product.

7. The dental flosser according to claim 1, wherein the U-shaped portion, the handle portion and the floss strand attachment member are made of the same thermoplastic material through an injection molding process and the floss strand is injection molded with the dental flosser in situ.

8. The dental flosser according to claim 1, wherein the first end of the floss strand is permanently attached to the first arm of the U-shaped portion and cannot be pulled out from the first arm of the U-shaped portion, and the first end of the floss strand is injection molded into the first arm of the U-shaped portion.

9. The dental flosser according to claim 8, wherein the second end of the floss strand is permanently attached to the floss strand attachment member and cannot be pulled out from the floss strand attachment member, and the second end of the floss strand is injection molded into the floss strand attachment member.

10. The dental flosser according to claim 9, wherein adjustment of the tension of the floss strand is accomplished by moving only the second end of the floss strand which is attached to the floss strand attachment member, whereas the position of the first end of the floss strand is not moved relative to the first arm of the U-shaped portion.

11. The dental flosser according to claim 1, wherein the floss strand attachment member is detachably connected to the handle portion via a frangible connecting point, wherein the floss strand extends linearly from the first arm of the U-shaped portion, through the channel and to the floss strand attachment member.

12. The dental flosser according to claim 11, wherein the frangible connecting point is on the same plane as the channel.

13. The dental flosser according to claim 1, wherein the floss strand attachment member is detachably connected to the handle at a frangible connecting point, and wherein the frangible connecting point is configured to be broken, such that the floss strand attachment member is separated from the handle portion to generate a detached floss strand attachment member.

14. The dental flosser according to claim 1, wherein the channel at or near the end of the second arm is generally perpendicular to the second arm.

15. The dental flosser according to claim 2 wherein the contact member has a width and a thickness and defines a second plane in the width direction, wherein the user can maneuver the floss strand attachment member along the slot with the contact member where the second plane is parallel to the first plane to increase or decrease tension of the floss strand.

16. The dental flosser according to claim 2, wherein the male member extends from the contact member and through the slot in a lateral direction such that male member extends from the first side surface of the handle toward the second side surface of the handle.

17. The dental flosser of claim 3 wherein the male member can move along the slot in a direction that is not parallel to the portion of the floss strand that extends between the first and second arms.

* * * * *